United States Patent [19]
Lerner

[11] 3,879,918
[45] Apr. 29, 1975

[54] METHOD FOR PACKAGING ARTICLES
[75] Inventor: Hershey Lerner, Toledo, Ohio
[73] Assignee: Automated Packaging Systems, Inc., Twinsburg, Ohio
[22] Filed: May 11, 1973
[21] Appl. No.: 359,436

Related U.S. Application Data
[62] Division of Ser. No. 211,924, Dec. 27, 1971, Pat. No. 3,774,367.

[52] U.S. Cl. .................................. 53/30; 53/384
[51] Int. Cl... B65b 57/02; B65b 43/12; B65b 43/26
[58] Field of Search .......... 53/29, 30, 35, 187, 188, 53/190, 191, 258, 260, 261, 384–386

[56] References Cited
UNITED STATES PATENTS
2,884,328  4/1959  Johnson ........................... 53/261 X
2,885,850  5/1959  Smith .............................. 53/261 X
3,264,796  8/1966  Tomczak et al. .................. 53/261
3,455,088  7/1969  Lerner ............................ 53/385

*Primary Examiner*—Robert L. Spruill
*Attorney, Agent, or Firm*—Watts, Hoffmann, Fisher & Heinke

[57] ABSTRACT

A packaging machine and a method of packaging are disclosed by which articles are inserted into plastic bags. The bags are supported at a loading station, expanded and removed from the loading station with the article. Bags are fed from a supply magazine to the loading station automatically by a bag feeding mechanism. The loading station is defined by bag supporting horns which are constructed so that bags are readily removed from the loading station with the article while the bags are in an expanded condition.

9 Claims, 21 Drawing Figures

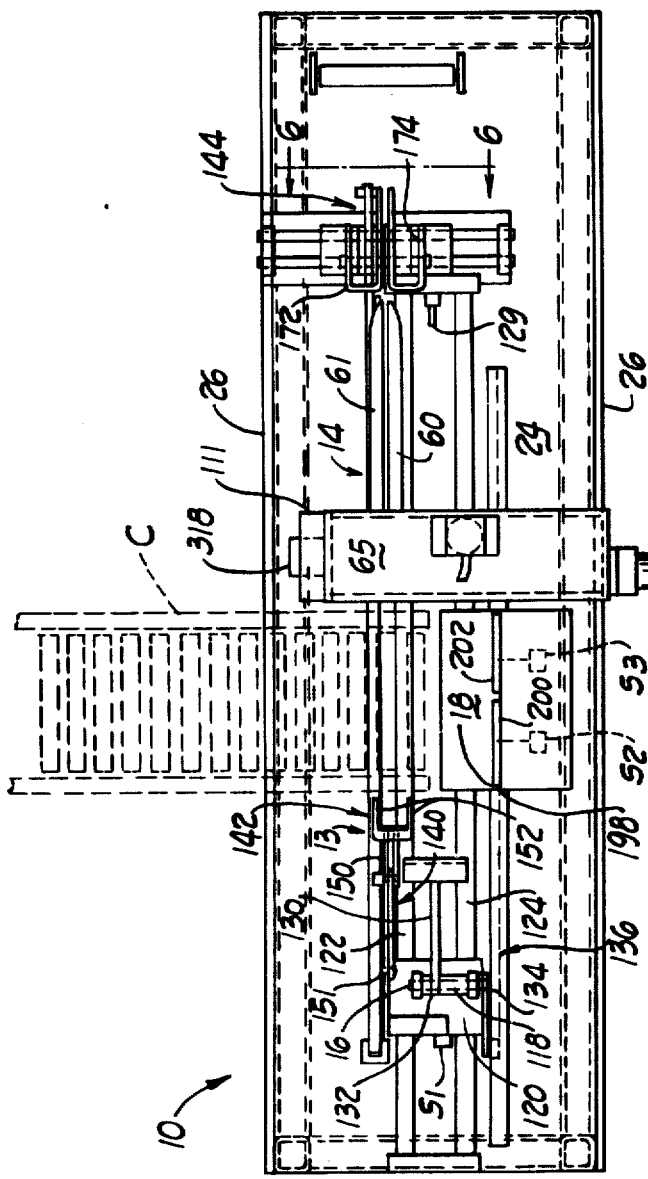
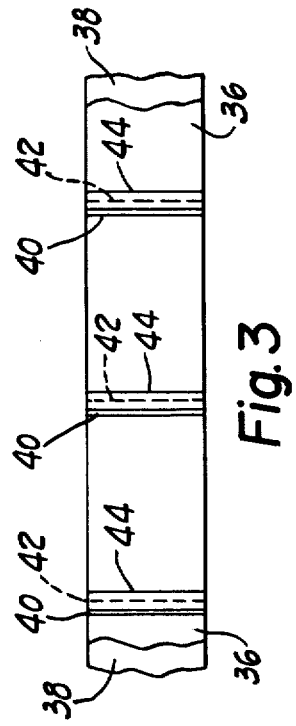
Fig. 2
Fig. 3

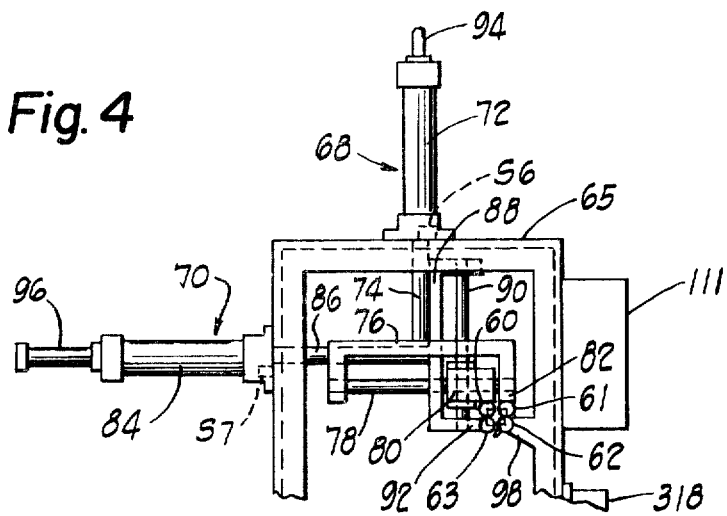
Fig. 4
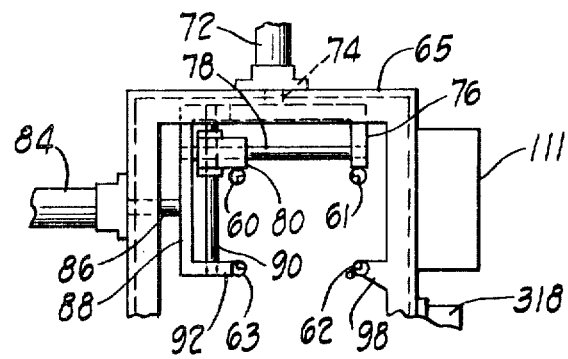
Fig. 5
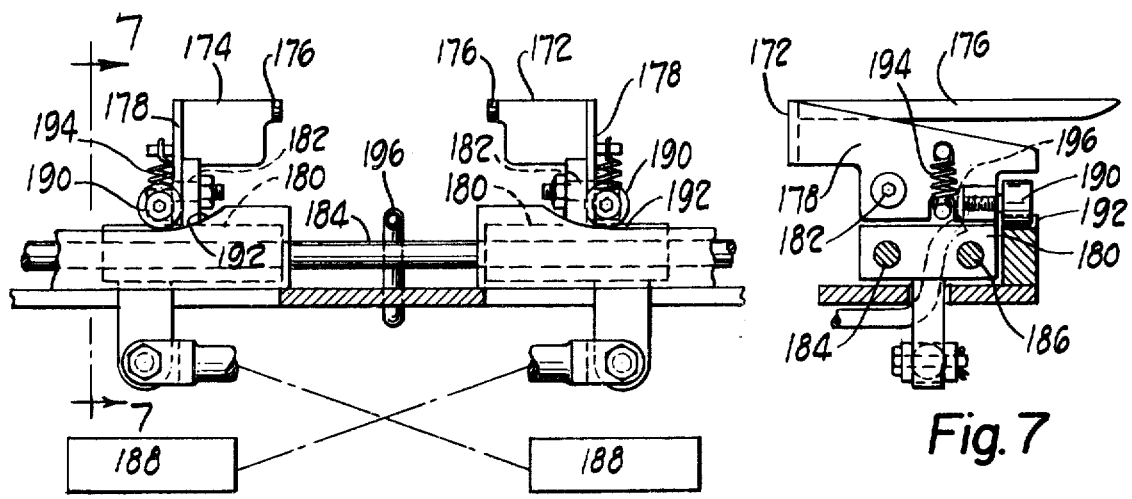
Fig. 6
Fig. 7

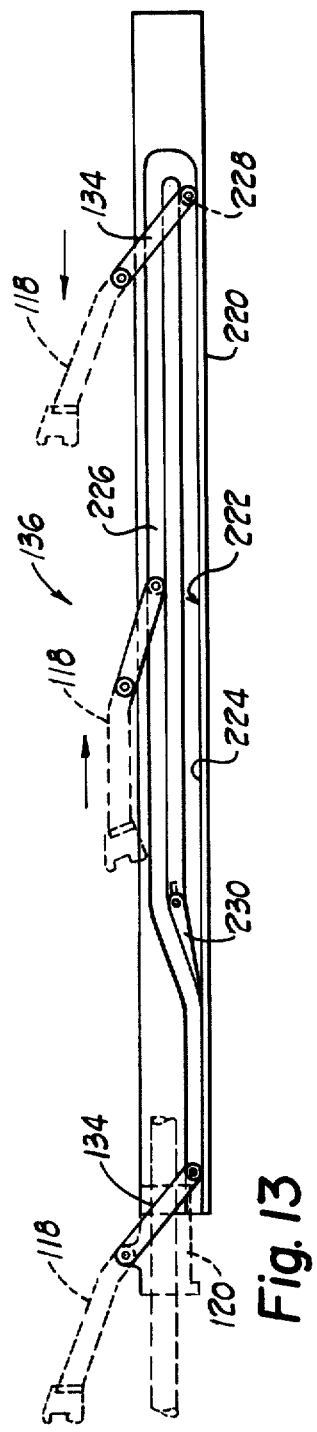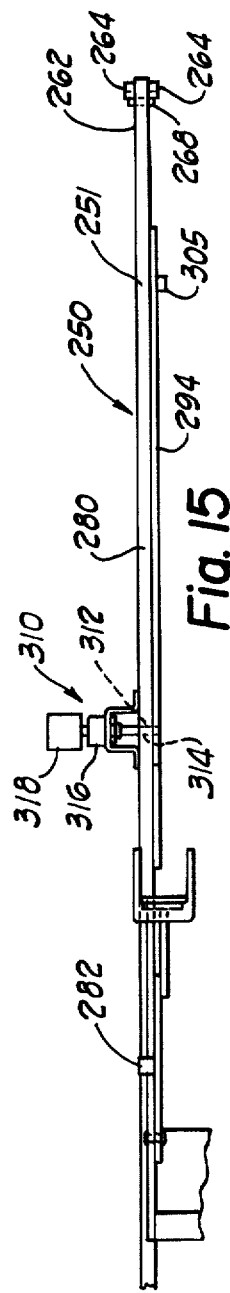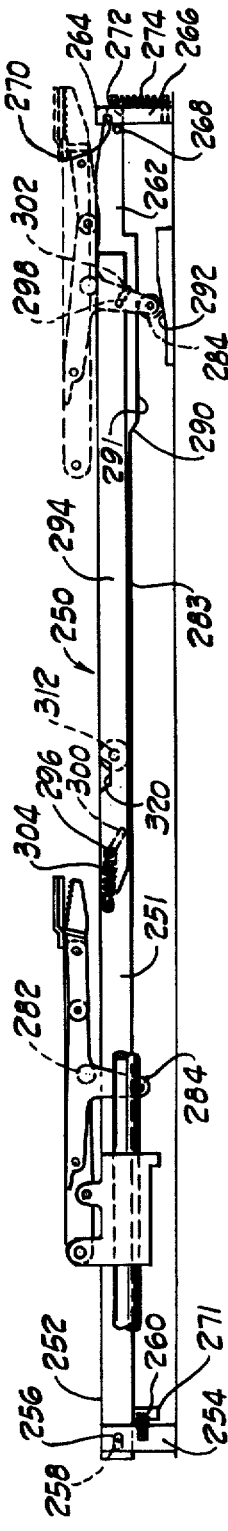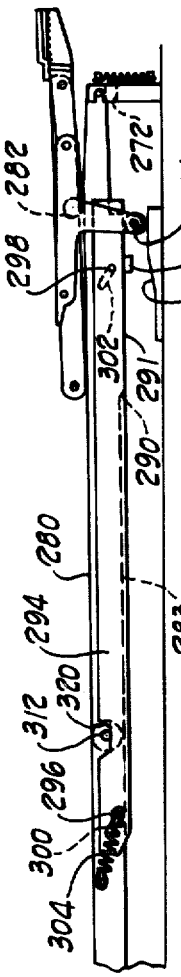

METHOD FOR PACKAGING ARTICLES

This is a division, of application Ser. No. 211,924, filed Dec. 27, 1971 and now Pat. No. 3,774,367.

BACKGROUND OF THE INVENTION

1. Field of the Invention

The present invention relates to a method and apparatus for packaging and more particularly relates to a method and apparatus for packaging articles in bags or wrappers formed from plastic film material.

2. The Prior Art

The prior art has proposed various methods and apparatus for packaging articles in plastic bags or wrappers. When articles of relatively large cross sectional areas and volumes have been packaged, problems have been encountered in maintaining a bag or wrapper positioned for receiving the articles. These problems have resulted primarily from the lack of stiffness of the plastic film material from which such bags or wrappers are constructed. In particular, it has been difficult to handle and position containers formed by plastic film where the volume of the article to be packaged approaches the volume of the container itself.

In some prior art proposals the plastic containers were placed on supporting members by hand after which the supporting members were positioned to open the containers for insertion of an article. In apparatus where the container was stretched by the supporting members the support members had to be moved toward each other to relax the containers in order to permit removal of the container and article from the supporting members without damaging the container. Such apparatus tended to be too slow in operation to be used for packaging large quantity production articles. Furthermore, in most circumstances the containers employed by this kind of apparatus generally had to be of larger size or volume than the article being packaged. This resulted in relatively high packaging material costs and in some circumstances, unattractive packaging.

The prior art has also proposed shrinking plastic film containers about articles. In one such proposal, a plastic film was heated, placed about an article and allowed to cool which resulted in the film material shrinking tightly about the article.

When tubular plastic members such as bags or wrappers were employed in a heat shrinking packaging machine, the container handling problems referred to previously were not diminished and the packaging machinery was further complicated by the inclusion of film heating equipment.

The prior art also proposed packaging articles, such as meat and other foodstuffs, in plastic containers which were evacuated after the article was placed in the container. In some proposals the containers were provided with vents through which air or gas in the package was withdrawn prior to flash freezing. In other proposals a hollow needle was inserted into the package for withdrawing entrapped air or gas. These proposals provided a package in which the plastic film material conformed to the article, as in a heat shrink type package, and although heating equipment was eliminated provision had to be made for evacuating the packages.

SUMMARY OF THE INVENTION

The present invention provides a new and improved method and apparataus for packaging articles in plastic bags or wrappers at relatively high rates wherein the plastic bags or wrappers are automatically fed to a loading station where they are supported in an open condition for loading and in which the bag or wrapper and article are removed from the loading station coincident to loading the article into the bag or wrapper.

The invention is illustrated and described in connection with loading articles into plastic bags however it should be appreciated that the principles of the invention are applicable to placing tubular bands or cylinders of plastic material, i.e., wrappers, on articles if desired.

An important feature of the invention resides in the provision of a packaging method and apparatus wherein a relatively small volume bag formed from plastic film material is resiliently stretched by supporting members to define an article receiving volume greater than that of an article being packaged and wherein the bag, or wrapper, and article move together away from the supporting members whereupon the bag or wrapper elastically returns towards its nonexpanded volume and in so doing tightly conforms to the article. This feature provides for packaging of articles in tightly conforming plastic containers without requiring heat shrinking procedures or evacuation of the containers.

Another feature of the invention resides in a packaging method and apparatus wherein plastic bags are automatically fed one at a time to a loading station defined by projecting bag supporting horns. The bag feeding mechanism is constructed and arranged so that bags are removed one at a time from a supply magazine and partially opened by bag positioning members extending into an open end of the bag. A side of the bag opening is then gripped and the bag is removed from the positioning members and drawn over the projecting ends of the supporting horns. The supporting horns are moved apart to expand the bag to an open condition. The feeding mechanism automatically release the bag when it is properly positioned on the horns.

Another feature of the invention resides in the construction of bag supporting hrons which are adapted to extend into a bag and are movable apart to expand the bag to an open condition and wherein an air bearing or cushion is provided between each horn and the bag so that the bag is freely slid from the horns without requiring movement of the horns toward each other to relax the tension of the bag material.

Additional advantageous features of the invention will become apparent from the following detailed description of a preferred embodiment of the invention made with reference to the accompanying drawings which form a part of the specification.

BRIEF DESCRIPTION OF THE DRAWINGS

FIG. 2 is a top plan view of the machine of FIG. 1;

FIG. 3 is an elevational view of a strip of containers used in the machine of FIG. 1;

FIG. 4 is a cross sectional view of part of the machine of FIG. 1 seen from the plane indicated by the line 4—4 of FIG. 1;

FIG. 5 is a view similar to FIG. 4 with parts shown in different positions and parts broken away;

FIG. 6 is a cross sectional view seen from the plane indicated by the line 6—6 of FIG. 2 and with parts shown schematically;

FIG. 7 is a cross sectional view seen from the plane indicated by the line 7—7 of FIG. 6;

FIG. 8b is a cross sectional view taken within the line 8b of FIG. 8a;

FIG. 13 is a cross sectional view of a portion of the machine of FIG. 1 with parts shown in various different operating positions;

FIG. 14 is a cross sectional view of a portion of the machine shown in FIG. 1 with parts shown in various different operating positions, FIG. 15 is a fragmentary top plan view of part of the mechanism illustrated in FIG. 14;

FIG. 16 is a view similar to FIG. 14 with parts shown in a different operating position.

DESCRIPTION OF A PREFERRED EMBODIMENT

Figure 1:
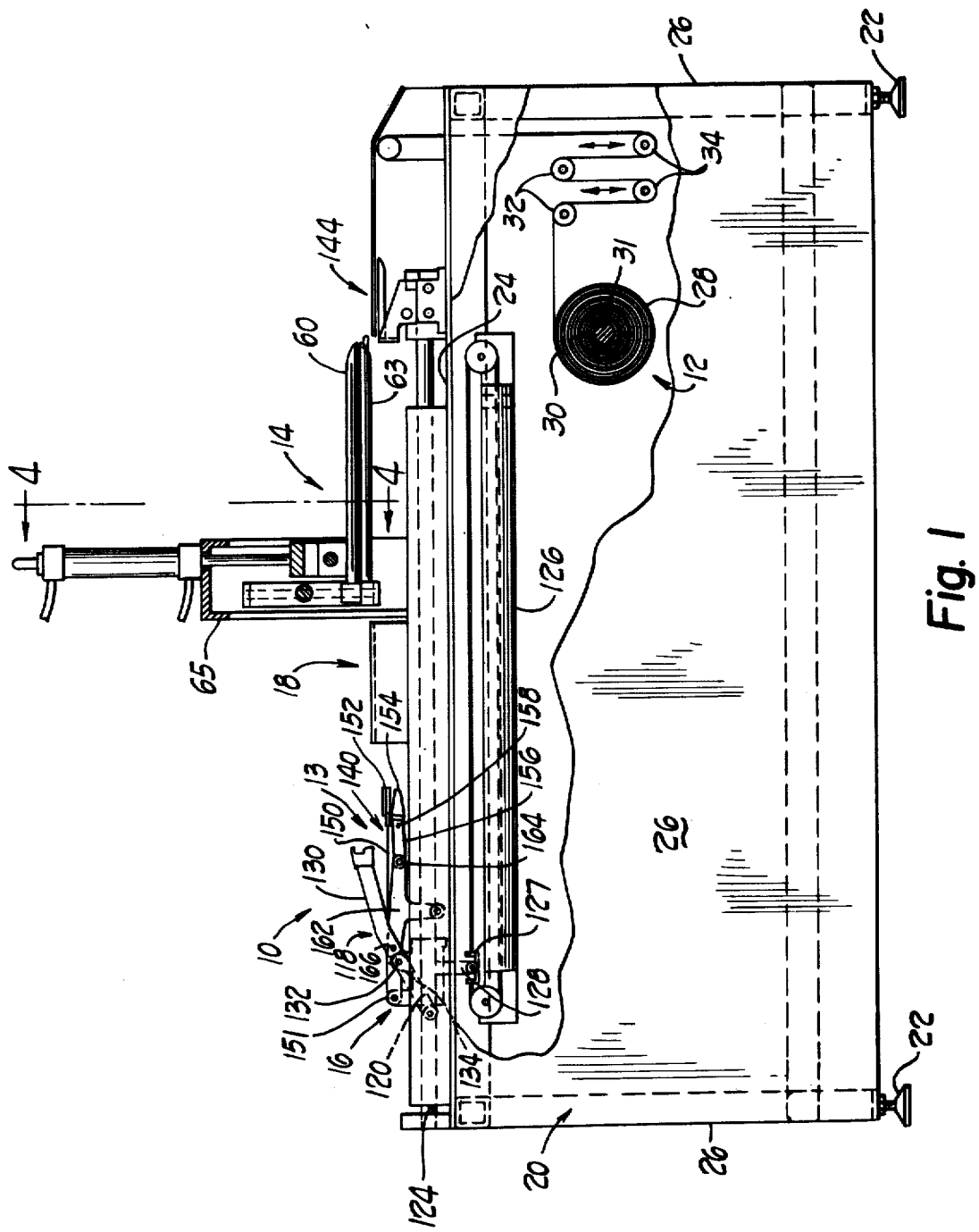
FIG. 1 is an elevational view of a packaging machine embodying the present invention with parts broken away and parts shown in cross section.

A packaging machine 10 embodying the present invention is illustrated in FIGS. 1 and 2 of the drawings. The machine 10 comprises a container supply magazine 12 from which tubular contaienrs formed of plastic film material are fed by a feeding mechanism generally indicated at 13. Individual containers, disclosed in the form of bags formed from plastic film are fed to and supported at a loading station 14 in an open condition and an article being packaged is inserted into the open bag. In the preferred embodiment, an article advancing ram assembly 16 advances articles to the loading station and moves the articles into the open bag. The article and its surrounding bag are discharged together from the loading station. The feed mechanism 13 thereafter advances the succeeding container to the loading station 14 to initiate the succeeding packaging cycle.

The machine 10 is illustrated in the drawings being used to package whole chickens. The chickens are placed in plastic or paper trays and are fed to an article receiving station 18 defined by the machine 10 along a suitable conveyor system C, part of which is illustrated by broken lines in FIG. 2. Each chicken and its associated tray constitute an article to be packaged and each article is advanced from the receiving station 18 through the loading station 14 by the ram assembly 16. The article moves into an expanded bag at the loading station and when the article engages the bottom or closed end of the bag, the article and surrounding bag move from the loading station 14 to a suitable bag sealer (not shown) at which the open end of the bag is closed and heat sealed.

Referring now particular to FIG. 1 the machine 10 is comprised of a framework 20 suitably formed by vertical and horizontal structural members and which is supported by legs 22. A horizontal bed 24 is connected across the top of the framework 20 and side panels 26 are attached along the sides of the framework to define a chamber 28 within the machine. The chamber 28 houses various controls and actuators as well as the container supply magazine 12.

THE SUPPLY MAGAZINE

In the illustrated embodiment of the invention, the magazine 12 contains a coiled roll of bags formed in a continuous web or strip 30. The roll is connected to a rotatable support shaft 31 and the end of the strip is trained across guide rollers 32 and dancer rollers 34 to the part of the feeding mechanism 13. The rollers 32 and 34 are schematically shown. As the bags are fed the roll 30 rotates to unreel the container strip from the roll. The dancer rollers 34 may be of conventional construction and are associated with a brake (not shown) for controlling the rotational speed of the shaft 32 and the roll of containers as the strip 30 is fed from the roll.

The container strip 30 (FIG. 3) can be of any suitable construction but is preferably a flattened tube of plastic film-like material which may be considered formed of two overlying plies 36, The plies are heat sealed together and serrated along parallel lines 40, 42, respectively, extending across the strip at spaced longitudinal locations. Each heat seal line 40 provides end seal extending completely across the plies 36, 38. Each serrated line 42 extends completely across the plies and defines a weakened area of the strip along which successive bags are separable. The open end of each bag is formed by a slit 44 which extends across the ply 36 but not the ply 38. Each slit 44 is formed adjacent and parallel to a serration line 42 so that the serration line 42 is disposed between the end seal line 40 of one bag and the opening slit 44 of the succeeding bag. The strip is coiled so that as containers are let off from the roll 30 the open end of each bag preceeds the closed end of the bag.

THE LOADING STATION

Bags are fed one at a time from the magazine 12 to the loading station 14 where the bags are successively expanded to an open condition for receiving an article. In a preferred embodiment of the invention, four projecting bag supporting horns 60–63 are disposed at the loading station for receiving and opening the bags.

Referring now to FIGS. 1, 2, 4 and 5, the horns 60–63 project parallel to each other away from the article receiving station and are supported above the bed 24 by a bridge 65. The horns are movable relative to each other between a closed position in which the horns extend closely adjacent each other (see FIG. 4), and an open position in which the horns are spaced apart (see FIG. 5) by vertical and horizontal actuators 68, 70, respectively, which are connected to the bridge 65.

The vertical actuator 68 comprises a vertically oriented fluid operated ram 72 connected atop the bridge 65. The ram 72 includes a piston rod 74 which extends through the bridge to a U-shaped support bracket 76 which is carried at the projecting end of the piston rod. Downwardly projecting legs of the U-shaped bracket 76 carry a guide rod 78 which extends across the bracket between the legs. The guide rod 78 is a cylindrical member which carries a slide block 80 which is movable horizontally along the rod 78 between downwardly projecting ends of the bracket legs. The bag supporting horn 60 is connected to the slide block 80 while the horn 61 is connected to the end 82 of one of the downwardly projecting legs of the bracket 76. The horns 60, 61 are movable vertically toward and away from the horns 62, 63 by operation of the ram 72.

The horizontal actuator 70 comprises a horizontally oriented fluid operated ram 84 connected to one side of the bridge 65 which comprises a piston rod 86 extending through the bridge to a U-shaped support bracket 88 having legs projecting horizontally away from the piston rod 86. A cylindrical guide rod 90 is disposed between the projecting legs of the support bracket and the slide block 80 is slidably mounted on the guide rod 90 for movement in a vertical direction relative to the bracket 88 along the rod 90. The bag supporting horn 63 is fixed to the end 92 of the lower bracket leg so that the horns 60–63 are movable horizontally relative to the horns 61, 62 as the ram 84 is actuated.

It should be appreciated that the horn 60 connected to the slide block 80 is slidably movable along both guide rods 78, 90 as the actuators 68, 70 are simultaneously operated. The strokes of the rams 72, 84 are adjustable snubbers 94, 96, respectively, so that the locations of the horns 60, 61 and 63 when in the opened position varies with respect to the position of the horns 62 by adjustment of the snubbers.

The horn 62 is stationarily mounted upon a support arm 98 connected to the bridge 65.

when the horns are in their closed position, they are disposed nearly tangent to each other as is best seen in FIGS. 1, 2 and 4. In this position of the horns the piston rods 74, 86 are fully extended and the movable horns 60, 61 and 63 are located immediately adjacent the fixed horn 62. When the piston rods 74, 86 are retracted (FIG. 5) the horns are moved apart from each other to an open position with each horn approximating the corner of a rectangular space. During the opening movement of the horns the horn 63 moves horizontally away from the horn 62, the horn 61 moves vertically from the horn 62 and the horn 60 moves diagonally away from the horn 62.

When the horns are in their closed position, the cross sectional area of the space occupied by the horns is substantially smaller than the cross sectional area of an opening of a bag being advanced to the loading station. Accordingly, the bag can be drawn over the horns, i.e., the bag is drawn towards the bridge 65 so that the horns 60–63 all project into the bag. When the horns extend to the bottom of the bag, the actuator 68, 70 are operated so that the horns are spread apart to open the bag.

In one preferred mode of operation of the machine 10, the horns resiliently stretch the bag so that the expanded bag tightly extends about the horns. The expanded bag is freely slidable from the horns when the horns are in their open position regardless of the tightness of engagement between the bag and the horns by virtue of an air bearing provided between the bag and the horns. Referring now to FIGS. 8 and 8a–8c, the horns 60–63 are all hollow tubular members having closed projecting ends. The opposite ends of the horns communicate the interior of each horn to a source of compressed air 100 through air hoses 102, 103, respectively, and a control valve 104. Each horn is provided with an array of small diameter holes 106 each extending between the interior of the respective horn and the exterior surface of the horn. The holes are aligned along the line of engagement between the bag and the horn periphery.

When the valve 104 is opened, pressurized air is introduced into the horns and flows through the holes 106. When an expanded bag is supported on the horns this flow of air establishes an air bearing or air film between the horns and the bag. The existence of this air bearing or film enables the bag to be freely slid from the projecting ends of the horns while the horns are maintained in their fully opened positions.

The fixed horn 62 supports a nozzle 110 which communicates with the interior of the horn and opens in the direction of the projecting ends of the horn. The nozzle 110 directs a blast of air from the projecting end of the horn 62. The air blast impinges on the open end of a bag advancing towards the horns and maintains the bag mouth spread to assure that the bag is open as it is drawn over the horns.

Referring again to FIG. 4 a fluid pressure distributor assembly 111 is connected to the bridge 65 for controlling the distribution of fluid to the horns 60–63 and to the rams 72, 84. The rams 72, 84 are preferably double acting and pneumatically operated anad control valves (not shown) for the rams form part of the assembly 111. The valve 104 is disposed in the assembly 111 and hoses (not illustrated) extend from the assembly 111 to the horns and to the rams.

The horn 62 supports a plunger 112 which extends from the projecting end of the horn 62 for engagement with the bottom of a bag which has been drawn onto the horns. The plunger 112 is depressed by the bottom of the bag to operate a switch 114 which, among other things, controls operation of the horn actuators, 68, 70. Accordingly, the horns are maintained in their closed position until the plunger 112 encounters the bottom of a bag drawn onto the horns at which time the plunger 112 is depressed and operates the switch 114. The switch 114 is actuated and in turn effects operation of the rams so that the horns are automatically moved to their open position. The operation of the switch 114 is described in more detail below in relation to operation of the machine.

THE ARTICLE RAM ASSEMBLY

Figure 8:
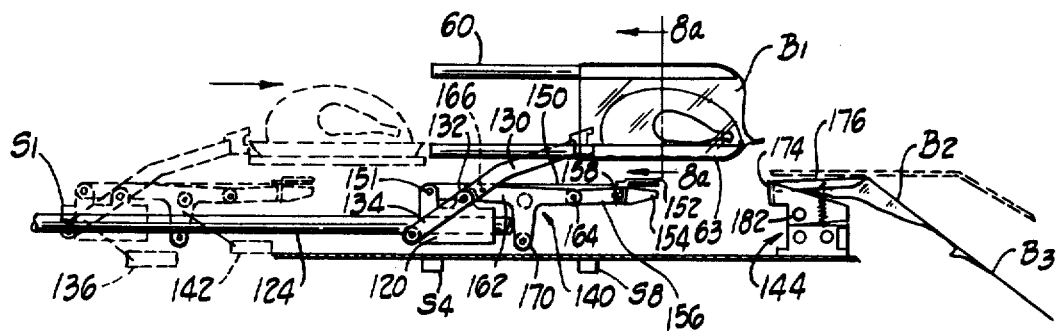
FIG. 8 is a side elevational schematic view of part of the machine of FIG. 1 with portions shown in alternate positions.
Figure 8A:
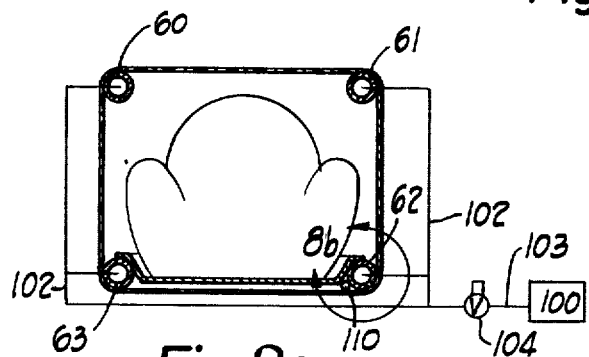
FIG. 8a is a cross sectional view seen from the plane of the line 8a—8a in FIG. 8.
Figure 8B:
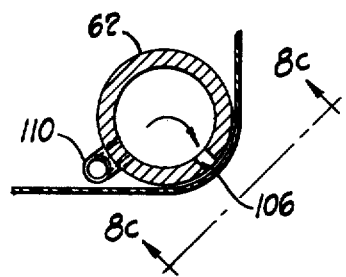
Figure 8C:
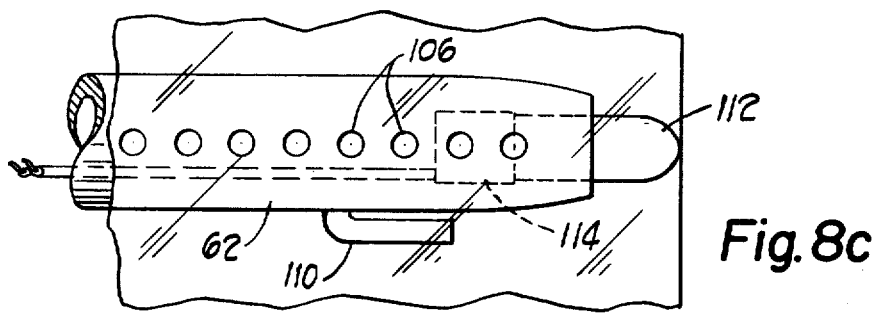
FIG. 8c is a view seen from the plane indicated by the line 8c—8c of FIG. 8b.

Articles are advanced one at a time from the receiving station and through the loading station by the article ram assembly 16. Referring now to FIGS. 1, 2 and 8 the ram assembly 16 comprises an article engaging ram member 118 connected to a carriage 120. The carriage is supported over the bed 24 by a pair of parallel cylindrical ways 122, 124 which extend through the carriage. The carriage 120 is reciprocated back and forth along the ways 122, 124 by an actuator 126 supported within the chamber 28. The actuator is preferably a double acting pneumatic piston-cylinder actuator in which the piston is connected to cables which extend from opposite ends of the cylinder. The end of each cable is connected to a cleat 127 which is fixed to an arm 128 projecting from the carriage through a slot in the bed 24 (see FIG. 1). Such an actuator is knwon as a "cable cylinder," is commercially available and, accordingly, is not further described.

The actuator 126 moves the carriage through a forward stroke during which the carriage moves past the receiving station 18 and loading station 14 to a shock absorbing abutment 129 (FIG. 2) at the end of the ways 122, 124. During the return stroke the actuator 126 returns the carriage 120 to its initial position.

The ram member 118 is pivoted to the carriage 120 and comprises a projecting article engaging arm 130, a rock shaft 132 journaled to the carriage 120 and an operating arm 134 extending along side of the carriage 120 from one end of the rock shaft 132. An actuator arrangement 136 cooperates with the arm 134 to pivot the ram member 118 relative to the carriage so that during the forward stroke of the carriage 120 the article engaging arm 130 is elevated for moving the article through the loading station 14 and during the return stroke of the carriage the arm 130 is lowered so that it does not interfere with the horns 60–63. The actuator arrangement 136 is shown schematically in FIG. 8 and a preferred construction is described in detail below in reference to FIG. 13.

THE FEEDING MECHANISM

The feeding mechanism 13 comprises a gripper jaw assembly 140 carried by the carriage 120, an actuator assembly 142 for the gripper jaws and a bag positioning mechanism 144 stationed adjacent the projecting ends of the horns 60–63. The actuator 142 is shown schematically in FIG. 8 and is described in more detail below.

Referring now to FIGS. 1, 2 and 8 the gripper jaw assembly comprises a body member 150 pivoted to the carriage 120 by a pivot pin 151 extending forwardly from the carriage slightly beyond the ram member 118. The body member defines a pair of fixed jaws 152 spaced laterally apart at its forwardly projecting end. A pair of movable gripper jaws 154 which mate with the fixed jaws 152 form part of a lever 156 pivoted to the body by a pin 158. A rearwardly projecting end of the lever 156 is connected to a bell crank 162 by a pivot pin 164. The bell crank 162 is in turn pivoted to the body 150 by a pin 166. As the bell crank is moved clockwise about its pin 166, the lever 156 is pivoted counterclockwise to close the jaws 152, 154. If the bell crank 162 is pivoted counterclockwise relative to the body 150, the lever 156 pivots clockwise to open the jaws. A spring (not shown) is connected between the bell crank 162 and the body 150 to bias the bell crank counterclockwise relative to the body so that the jaws are normally opened. An operating arm 170 of the bell crank is associated with the actuating assembly 142 to control opening and closing of the jaws. The actuating assembly 142 is described in greater detail presently.

Referring now to FIGS. 1, 2, 6 and 7 the bag positioning assembly 144 comprises a pair of bag engaging finger members 172, 174 supported on the bed 24 adjacent the projecting ends of the horns 60–63. The finger members are generally U-shaped as viewed in top plan (see FIG. 2) and each comprises a finger portion 176 projecting away from the horns and a finger body portion 178. The finger body portion 178 is connected to a support block 180 by a pivot pin 182. The support blocks 180 are each slidably mounted on ways 184, 186 which extend transverse to the direction of extent of the finger portions 176. The support blocks 180 are each connected to a respective actuator. 188. The actuators 188 are schematically shown in FIG. 6 and are preferably double acting pneumatic rams which slide their respective support blocks and finger members toward and away from each other along the ways 184, 186 between "open" and "closed" positions.

When the finger members are in their closed positions, i.e., adjacent each other, they coextend along the bed and are positioned for extending into a bag of the container strip as the container strip is slid over the fingers towards the horns. In the preferred embodiment each finger body portion 178 is pivoted about the pin 182 relative to the support block to raise the ends of the finger portions towards the container strip when the finger members are in their closed position. When the finger portions are raised, their entry into a bag in the container strip is facilitated. Pivoting the finger body is accomplished by a roller member 190 which projects from the forward end of the finger body and rides on a cam ramp 192 attached to the bed 24. When the finger members are moved to their open positions the finger portions are lowered. The finger bodies are biased toward their lowered positions by a spring 194 connected between the finger body and the associated support block.

In order to further assure that the finger portions 176 both enter the bags of the container strip, an air nozzle 196 is supported adjacent the fingers for directing a blast of air along the lower side of the strip. The air blast opens the slits 44 in the bags so that the finger portions easily enter the bags.

When the finger portions extend fully into the bag of a container strip, the finger members are actuated to their open positions, i.e., spread apart, so that the bag into which they extend is stretched substantially fully open and with the lower boundary of the bag mouth being stretched tautly between the finger portions. When the bag is thus positioned by the finger members, the gripper jaws can engage and grip the lower boundary of the bag mouth for stripping the bag from the fingers as is described presently.

Preferably the spreading of the finger members is adjustable to enable different sized bags to be positioned by the finger members without over expanding the mouths of relatively smmall bags. Means for adjusting the spreading dimensions of the finger members is not illustrated in the drawings but can take the form of adjustable snubbers associated with the rams 188, or adjustable stops for limiting movement of the support blocks 180 along the ways 184, 186.

FIGS. 8–12a schematically illustrate the operation of the machine 10 during one complete packaging cycle. Referring to FIG. 8 the article ram assembly 16 is illustrated at its "home" or cycle starting position in broken lines. In the home position, the carriage engages a control arm of a cycle starting switch S1 to operate the switch S1 to a condition for enabling the cycle to begin. An article is located at the receiving station 18. A bag B1 is positioned on the horns 60–63 which are at their open position to resiliently stretch the bag to an open condition for receiving the article. The finger portions 176 of the bag positioning assembly extend into and open the next bag B2 of the chain and the finger members 172, 174 are spread apart to their open position so that the mouth of the bag B2 is tautly stretched about the fingers. The jaws 152, 154 of the gripper assembly are open.

The cycle is initiated when the article is disposed on a support table 198 at the receiving station 14 and engages and depresses each of two switch operating panels 200, 202 (see FIG. 2), respectively, when panels are positioned at the side of the receiving station 18. The panels 200, 202 are associated with respective switches S2, S3 so that when the panels are depressed the switches S2, S3 are both actuated to enable the cable cylinder to actuate the carriage 120 through its forward stroke. If the article is skewed with respect to the support table 198 and its packaging path of travel one or the other of the switches S2, S3 will not be actuated by its respective panel and the cycle cannot be initiated until the article is properly positioned.

As the carriage 120 moves through its forward stroke the article is engaged by the ram arm 130 and is moved through the loading station 14 as is shown in solid lines in FIG. 8. The article rides on the horns 62–63 as it proceeds into the bag (see FIG. 8a).

The carriage 120 operates a switch S4 duringn its forward stroke prior to the carriage location at which the article engages the bottom of the bag. The switch S4 controls operation of the air valve 104 so that when the switch is actuated by the carriage the nozzles 110, 196 and the interior of the horns 60–63 are communicated to the source of compressed air. The switch S4 is preferably a proximity switch which is magnetically operated by a permanent magnet (not shown) carried by the carriage 120. Although a proximity type switch is preferred, the switch S4 could be a limit switch or a microswitch if desired.

Figure 9:
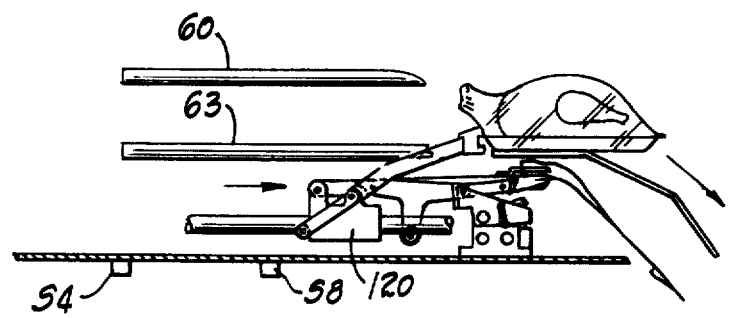
FIG. 9 is a view similar to FIG. 8 with parts shown in different operating positions.

The bag B1 is stripped off the horns 60–63 by the article being thrust against the bottom of the bag and moved beyond the projecting ends of the horns. The bag slides freely from the horns by virtue of the air bearing which is established between each of the horns and the bag B1. As the carriage 120 approaches the end of its forward stroke (as shown in FIG. 9) the article and the bag 131 are discharged together from the loading station 14. The gripper jaws 152, 154 move to engage the lower side of the mouth of the bag B2 and automatically close to tightly grip the bag B2.

Continued forward movement of the carriage results in the gripper jaws sliding the bag B2 off of the finger members. When the opening of the bag B2 has cleared the ends of the finger members, the gripper jaws are elevated above the level of the fingers to lift the bag B2 above the fingers. This elevation occurs at the end of the forward stroke of the carriage 120. At the same time, the ram arm 130 clears the projecting ends of the horns 60–63.

When the carriage 120 reaches the end of its forward stroke, a switch S5 is engaged and operated by the carriage to enable actuation of the horns 60–63 to their closed positions. The switch S5 is preferably associatd with the abutment 129 and can be a limit switch mechanically operated by the carriage 120. The switch S5 governs operation of control valves (not shown) for vertical and horizontal rams 72, 84. The control valves operate the rams to their fully extended conditions at which the horns 60–63 are in their closed positions.

When the horns have been actuated to their closed positions, limit switches S6, S7 associated with respective rams 72, 84, are closed to enable the cable cylinder 126 to drive the carriage 120 through its return stroke. The switches S6, S7 may be of any suitable type mounted on the bridge or integral with the rams. The switches are schematically shown integral with the rams (see FIGS. 4 and 5).

Shortly after the carriage 120 begins its return stroke, a proximity switch S8 (FIG. 9) is actuated by the carriage 120 to effect movement of the finger members 172, 174 to their closed positions. The switch S8 is located so that the gripper jaws 152, 154 have been moved back towards the horns 60–63 from the finger members 172, 174 when the fingers are moved to their closed position. As the fingers move towards each other they are pivoted so that their projecting ends are elevated to facilitate their entry into the opening of the succeeding bag B3 as is described above. The elevated position of the finger members is shown in FIG. 10.

Figure 10:
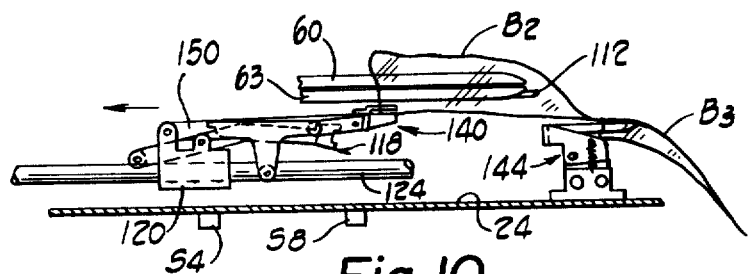
FIG. 10 is a view similar to FIG. 9 with parts shown in another operating position.
Figure 11:
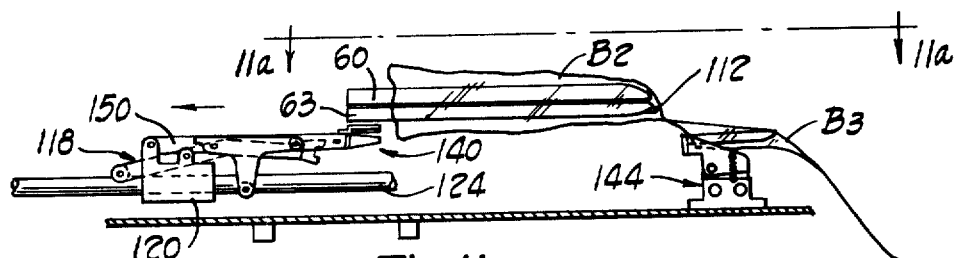
FIG. 11 is a view similar to FIG. 10 with parts shown in another operating position.
Figure 11A:
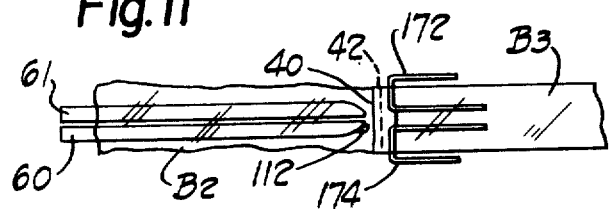
FIG. 11a is a view seen from the plane indicated by the line 11a—11a of FIG. 11.

Referring now to FIG. 10, as the carriage continues along its return stroke the ram arm 130 drops down below the level of the horns 60–63. The gripper jaws 152, 154 continue to grip the bag B2 and pull the container strip 30 along with the carriage 120. As noted above, the jaws 152, 154 grip the lower side of the mouth of the bag B2 and the jaws are supported closely adjacent the lower sides of the horns so that the bag B2 is moved over the horns towards the bridge 65 while the succeeding bag B3 is moved toward the finger members 174, 174. The nozzles 110, 196 both direct air blasts into the bags B2, B3, respectively, so that as the bag B2 is drawn toward the horns 60–63 that bag is blown open and is drawn over the horns. The bag B3 is blown open by the nozzle 196 to insure that the finger portions 176 enter that bag as the container strip is drawn over them.

When the bottom of the bag B2 encounters the ends of the horns 60–63 the plunger 112 at the end of the horn 62 is depressed and operates the switch 114. This causes the finger members 172, 174 to immediately move their open positions within the bag B3, opens the gripper jaws for releasing the bag B2, and cuts off the air supply to the horns and the nozzles 110, 196. Closing of the switch 114 further initiates an operation of a time delay arrangement (not shown) which, after a brief interval, causes the horns 60–63 to be actuated to their open positions.

The projecting ends of the horns 60–63 are located close to the finger members 172, 174 so that regardless of the length of the individual bags of the container strip 30 the finger portions 176 extend fully into the bag B3 when the horns 60–63 extend fully into the bag B2.

Figure 12:
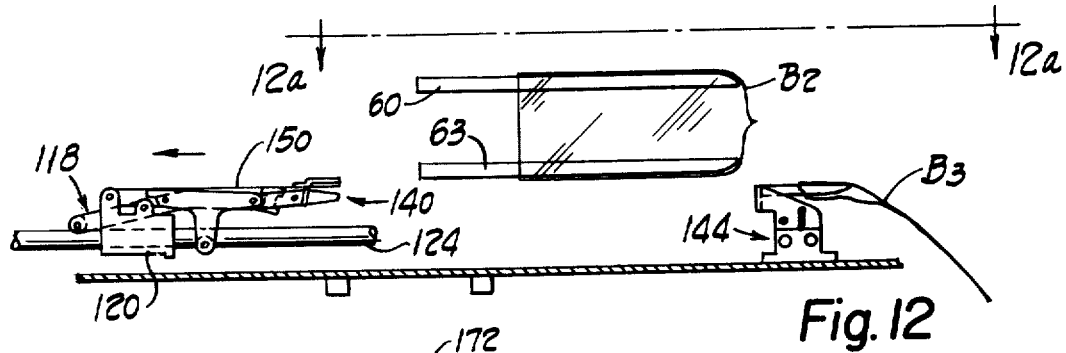
FIG. 12 is a view similar to FIG. 11 with parts shown in still another operating position.
Figure 12A:
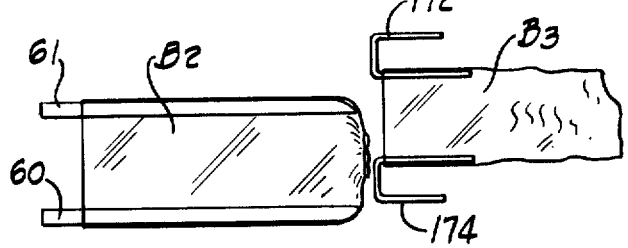
FIG. 12a is a view seen from the plane indicated by the line 12a—12a of FIG. 12.

When the horns 60–63 and finger members 172, 174 have moved to their open positions, the bags B2, B3 are automatically separated along the tear line 42 between them. Referring to FIGS. 12 and 12a it will be noted that when the finger members 172, 174 are spread apart the bag B3 is tautly supported around them. The fingers thus effectively anchor the bag B3 in position prior to opening of the horns. The horns 60–63, when in their open positions, preferably resiliently expand the bag B2 so that the bag B2 is tautly supported about the horns. The bag B2 is also raised and shifted laterally relative to the bag B3. This relative movement between the bags B2, B3 results in a shearing or tearing action at the tear line 42 and the bag are completely separated along the tear line 42.

The carriage 120 continues its rearward movement towards its home position at the end of the return stroke and as the carriage reaches the home position the ram arm 130 is returned to its elevated position for engaging the succeeding article to be packaged. When the carriage reaches its home position, the gripper jaw assembly 140 is lowered to its original position for engagement with the bag B3 during the next forward stroke of the carriage 120. The home switch S1 is actuated by the carriage when at its home position and, if an article is properly positioned at the receiving station 18, i.e., positioned so that the switches S2, S3 are actuated, the next packaging cycle is automatically initiated.

THE ARTICLE RAM ACTUATOR

The ram actuator 136 constructed according to a preferred embodiment of the invention is illustrated in FIG. 13. The actuator 136 comprises a cam member 220 which extends parallel to the ways 122, 124 adjacent the path of travel of the carriage 120. The cam member 220 is formed with a groove in one side which defines a cam track 222 having a lower track portion 224 and an upper track portion 226. The arm 134 of the article ram member 118 carrys a roller follower 228 at its end and the follower 228 projects into the cam track 222. The location of the follower 228 in the cam track 222 governs the angular position of the ram member 118 with respect to the carriage as the carriage reciprocates relative to the cam member 220. A switch or gate 230 is pivoted between one juncture of the cam track portions 224, 226 to control the path of movement followed by the roller follower 228 during the return stroke of the carriage. As the ram member moves with the carriage during its forward stroke, the follower roller 228 proceeds along the lower cam track portion 224 and maintains the article engaging arm 130 in its elevated position as is shown in FIG. 6. As the follower 228 passes the gate 230 the gate is raised from its position illustrated in FIG. 13 by the follower so that the follower continues moving along the lower track portion 224 to the end of the forward stroke. During the return stroke of the carriage the follower 228 is ramped upwardly into the upper track portion 226 by the gate 230 to rotate the ram member 118 about the axis of the shaft 132 relative to the carriage. This lowers the article engage arm 130 so that the arm 130 passes under the horns 60-63 and an article at the receiving station 18 during the return stroke of the carriage.

When the carriage reaches the end of its return stroke a biasing spring (not shown) acting between the ram member 118 and the carriage 120 urges the roller follower 228 back into the lower cam track portion 224 to raise the article engaging arm into position for a succeeding forward stroke of the carriage.

THE GRIPPER JAW ACTUATOR

The jaw actuator assembly 142 is illustrated in detail in FIGS. 14-16. The actuator arrangement 136 comprises a cam bar assembly 250 which extends along the bed 24 parallel to the ways 122, 124 at one side of the carriage 120 and below the gripper jaw body member 150.

The cam bar assembly 250 comprises a cam bar member 251 supported at its rearward end 252 by a post 254. The post 254 carries a pin 256 which extends through an elongated slot 258 formed in the cam bar 251. A compression spring 260 acts between the bar 251 and the post 254 to bias the bar towards its forward position, i.e. toward the position in which the pin 256 is engaged with the rearward end of the slot 258.

The forward end 262 of the cam bar 251 extends below and between the finger members 172, 174 and is supported between upwradly projecting ears 264 of a bifurcated post 266. The end 262 of the bar 251 carries a pin 268 which projects from opposite sides of the bar. The pin 268 is receivable within coaxial slots 270 formed in the ears 264. When the pin 268 is disposed in the slots 270 the upwardly facing walls of the slots support the forward end 262 of the cam bar.

When the carriage 120 is in its home position, the carriage engages an abutment 271 on the bar 251 and urges the bar 251 rearwardly with respect to the post 266 causing the pin 268 to be moved out of the slots 270 so that the forward end 262 of the bar 251 drops toward the bed 24. The forward end 262 is then supported by a land 272 formed on the post 266 between the ears 264. A tension spring 274 is connected between the bar end 262 and the post 266 to bias the bar end downwardly with respect to the post 266.

The cam bar 251 defines an upwardly facing guide surface 280 on its upper side which supports the gripper jaw body member 150. The body member 150 preferably includes a roller 282 engaging the surface 280 so that the body member 150 can reciprocate relative to the bar 251 with minimum friction. When the cam bar 251 is positioned with its forward end 262 supported on the land 272 the body member 150 is positioned for grasping the lower side of a bag mouth positioned on the finger portions 176 of the bag positioning mechanism 144. When the forward end 262 of the cam bar 251 is supported in the slots 270 the body member 150 is raised so that the gripper jaws move the gripped bag over the finger portions 176 and onto the horns as is described above.

The cam bar 251 additionally defines a downwardly facing cam surface 283 which is engaged by a roller follower 284 carried by the operating arm 170 of the bell crank 162. The cam surface 283 defines a ramp portion 290 near the forward end of the cam bar 251 which, when engaged by the follower 284 during the forward stroke of the carrige 120, rotates the bell crank 162 clockwise relative to the body member 150 to close the jaws 152, 154. The ramp portion 290 is located on the cam bar 251 such that the jaws 152, 154 are closed as they pass the bases of the finger portions 176 at which the bag mouth is positioned for gripping by the jaws. A bar surface portion 291 extends from the ramp portion 290 towards the end of the cam bar to maintain the jaws closed as the carriage 120 completes its forward stroke and begins its return stroke. The operation of the jaws during a forward stroke of the carriage is best seen in FIG. 14 in which alternate positions of the gripper assembly 140 are shown.

An elevating ramp 292 is supported on the bed 24 for engaging the follower 284 and elevating the cam bar 251 and gripper body member 150 after the jaws 152, 154 are closed. As is shown in FIG. 14, when the follower 284 engages the ramp 292 the follower is confined between the ramp 292 and the lower cam surface of the cam bar 251. This raises the cam bar 251 to a level at which the pin 268 moves into the slots 270 in the post 266. The compression spring 260 at the opposite end of the cam bar 250 moves the pin 268 to the base of the slot 270 so that the now elevated cam bar is supported by the slots 270 and the body member 150 is elevated.

The cam bar assembly 250 further includes a second cam bar 294 which is mounted on and partially coextends with the cam bar 251. The cam bar 294 carries pins 296, 298 which project from the bar 294 through elongated slots 300, 302 formed in the cam bar 251. The slots 300, 302 extend parallel to each other and at an angle with respect to vertical so that sides of the slots define ramps along which the pins 296, 298 may move. Thus the bar 294 can be ramped transversely of the bar 251. A tension spring 304 is connected between the bar 294 and the bar 251 for urging the bar 294 upwardly with respect to the bar 251 toward a position of the bar 294 which is shown in FIG. 14. The bar 294 defines a projecting abutment 305 which extends laterally toward the path of travel of the carriage 120 from the bar 294. As the carriage 120 approaches the end of its forward stroke the carriage engages the abutment 305 and causes the cam bar 294 to be ramped downwardly with respect to the bar 251 against the action of the spring 274.

when the bar has been ramped downwardly, a locking arrangement 310 locks the bar 294 in place relative to the bar 251. The bar 294 is locked in place with a lower face of the bar 294 aligned with the surface portion 291 of the cam bar 251. The locking arrangement is effective to lock the jaws 152, 154 closed as the carriage 120 moves along at least the initial portion of its return stroke.

The locking arrangement 310 comprises a detent pin 312 which is supported by the cam bar 251 and extends through a hole 134 in the bar 251. The pin 312 is connected to a spring biasing device 316 supported by the cam bar 251 and a solenoid 318 supported in the bridge 65. A notch 320 is formed in the bar 294 so that when the bar 294 is ramped downwardly with respect to the bar 251 the notch 320 is aligned with the hole 314 and the detent pin 312 is urged through the hole 314 by the spring biasing device 316. The resultant engagement between the notch 316 and the pin 312 prevents the bar 294 from moving away from its ramped down position with respect to the bar 251. This position of the bar 294 is shown in FIG. 16.

The bar 294 is automatically ramped upwardly with respect to the bar 251 (as shown in FIG. 14) when a bag has been drawn over the horns 60–63. The solenoid 318 is energized from the switch 114 in response to depression of the plunger 112 at the tip of the horn 62 by the bottom of a bag. When the solenoid 318 is energized the detent pin 312 is retracted against the force of the spring device 316 and the bar 294 is ramped upwardly with respect to the bar 251 by the spring 304 so that the gripper jaws 152, 154 are automatically opened to release the bag. In the preferred construction a lost motion connection (not shown) is provided between the pin 312 and the solenoid 318 so that the pin can move with the cam bar assembly 250 relative to the solenoid.

While a single preferred embodiment of a machine constructed according to the invention has been illustrated and described, the invention should not be considered limited to the precise construction shown. For example, the disclosed machine can be oriented vertically so that articles can be advanced through the loading station by gravity forces if desired. A machine constructed according to the principles of the invention can also be modified and employed to band articles such as bottles with plastic sleeves. Other modifications, adaptations and uses of the invention may occur to persons skilled in the art to which the invention pertains and it is intended to cover all such modifications.

adaptations, and uses which come within the scope of the appended claims.

What is claimed is:

1. A method of applying a tubular member composed of a plastic film to an article wherein the tubular member comprises a circumferentially continuous article engaging wall terminating at an article receiving mouth and wherein the maximum cross section area of the tubular volume defined by the wall in a relaxed condition is substantially smaller than the cross sectional area of the article comprising:
   a. feeding said tubular member to a loading station;
   b. positioning said tubular member about a plurality of expander members having projecting ends extending into said tubular member through said mouth;
   c. providing signal structure adjacent a projecting end of an expander member for sensing an end of said tubular member, providing a signal in response to the sensed presence of the end of the tubular member opposite said mouth at the projecting end of said expander member and terminating the feeding of said tubular member;
   d. resiliently expanding the volume of said tubular member by relatively moving said expanded members, in response to said signal, to locations at which the cross sectional area defined by said mouth and at least part of the tubular volume defined by the wall is greater than the cross sectional area of the articles;
   e. inserting the article through the mouth along a path extending between the expander members;
   f. establishing a controlled frictional relationship between said tubular member and said expander members to enable relative movement between said expander members and said tubular member in the direction of extent of the expander members;
   g. moving said tubular member and article in the direction of said path relative to said expander members to remove said tubular member from about said expander members and to remove the article from between the expander members while maintaining said expander members at said locations; and,
   h. resiliently contracting said tubular member toward its relaxed condition so that said wall is contracted about the article as the tubular member and article are removed from the expander members and the article engaging wall of the tubular member tightly engages and at least partly assumes the contour of the article.

2. A method of applying a tubular member composed of a plastic film to an article wherein the tubular member comprises a circumferentially continuous article engaging wall terminating at an article receiving mouth and wherein the maximum cross sectional area of the tubular volume defined by the wall in a relaxed condition is substantially smaller than the cross sectional area of the article comprising:
   a. moving said tubular member to a loading station;
   b. positioning said tubular member about a plurality of expander members having projecting ends extending into said tubular member through said mouth;
   c. resiliently expanding the volume of said tubular member by relatively moving said expander members to locations at which the cross sectional area defined by said mouth and at least part of the tubular volume defined by the wall is greater than the cross sectional area of the article;

d. inserting the article through the mouth along a path extending between the expander members;

e. moving said tubular member and article in the direction of said path relative to said expander members to remove said tubular member from about said expander members and to remove the article from between the expander members while maintaining said expander members at said locations;

f. providing a flow of air between said tubular member and said expander members while moving said tubular member from said expander members, said flow of air establishing an air bearing between said expander members and said tubular member; and, g. resiliently contracting said tubular member toward its relaxed condition so that said wall is contracted about the article as the tubular member and article are removed from the expander members and the article engaging wall of the tubular member tightly engages and at least partly assumes the contour of the article.

3. A method of applying a tubular member composed of a plastic film to an article wherein the tubular member comprises a circumferentially continuous article engaging wall terminating at an article receiving mouth, the maximum cross sectional area of the tubular volume defined by the wall in a relaxed condition is substantially smaller than the cross sectional area of the article, and wherein the tubular member forms part of a continuous strip of tubular members sucessively connected by weakened strip portions comprising:

a. moving said tubular member to a loading station;

b. gripping said tubular member and advancing the tubular member about a plurality of expander members having projecting ends extending into said tubular member through said mouth;

c. feeding the strip of tubular members from a storage location while advancing said tubular member;

d. stationarily positioning a portion of a second next succeeding tubular member adjacent the projecting ends of said expander members;

e. resiliently expanding the volume of said tubular member by relatively moving said expander members to locations at which the cross sectional area defined by said mouth and at least part of the tubular volume defined by the wall is greater than the cross sectional area of the article;

f. separating said first and second tubular members along said weakened strip portion when said expander members move relatively to said locations for expanding said first tubular member;

g. inserting the article through the mouth along a path extending between the expander members;

h. moving said tubular member and article in the direction of said path relative to said expander members to remove said tubular member from about said expander members and to remove the article from between the expander members while maintaining said expander members at said locations; and, i. resiliently contracting said tubular member toward its relaxed condition so that said wall is contracted about the article as the tubular member and article are removed from the expander members and the article engaging wall of the tubular member tightly engages and at least partly assumes the contour of the article.

4. A method of packaging articles in bags of a web-like chain of plastic bags wherein an article being packaged is advanced into a bag along a path of article travel comprising:

a. selecting a web-like chain of plastic bags each of which defines an internal volume having a cross sectional area, when in a relaxed condition, which is substantially smaller than the cross sectional area of articles to be packaged;

b. feeding a bag of the chain onto a plurality of expander members which are closely adjacent each other in bag receiving positions along one lateral side of the article path of travel and project into the bag through an open end thereof;

c. stationarily positioning the mouth of a second, next succeeding bag of the chain adjacent the projecting ends of the expander members in their bag receiving positions;

d. stretching the bag by relatively moving the expander members away from each other to bag expanding positions wherin the cross sectional area of the bag is larger than the cross sectional area of an article and the article path of travel extends between the expander members;

e. severing said bag from said second, next suceeding bag while stretching said bag;

f. providing low friction bearing means between the stretched bag and the expander members;

g. moving an article into the stretched bag along a path of travel extending between the expander members;

h. engaging the article with the closed end of the stretched bag while moving the article;

i. moving the bag along the bearing means from the expander members while maintaining the expander members in their bag expanding positions; and, j. resiliently contracting the bag about the article as the bag moves from the expander members.

5. A method of packaging articles in plastic bags comprising:

a. selecting plastic bags defining an internal volume having a cross sectional area when in a relaxed condition which is substantially smaller than the cross sectional area of articles to be packaged;

b. supporting a bag at a loading station on a plurality of expander members which project into the bag through an open end thereof;

c. stretching the bag by relatively moving the expander members away from each other to bag expanding positions wherein the cross sectional area of the bag is larger than the cross sectional area of an article;

d. moving an article into the stretched bag along a path of travel extending between the expander members;

e. engaging the article with the closed end of the stretched bag while moving the article;

f. moving the bag from the expander members while maintaining the expander members in their bag expanding positions;

g. providing low friction bearing means between the stretched bag and the expander members comprising establishing a flow of air between said expander members and adjacent surfaces of the bag to provide an air bearing between the expander members and the bag while the bag moves from the expander members; and, h. resiliently contracting the bag about the article as the bag moves from the expander members.

6. A method of packaging articles in plastic bags comprising:
   a. selecting a strip of plastic bags in which successive bags of the strip are connected by a weakened strip portion, each bag defining an internal volume having a cross sectional area when in a relaxed condition, which is substantially smaller than the cross sectional area of articles to be packaged;
   b. gripping a first bag and advancing the bag about a plurality of expander members which project into the bag through an open end thereof while feeding the strip of bags from a storage location;
   c. positioning the mouth of a next succeeding bag of the strip adjacent projecting end portions of said expander members;
   d. stretching the first bag by relatively moving the expander members away from each other to bag expanding positions wherein the cross sectional area of the first bag is larger than the cross sectional area of an article;
   e. separating the first and second bags along said weakened strip portion as said first bag is expanded;
   f. moving an article into the stretched first bag along a path of travel extending between the expander members;
   g. engaging the article with the closed end of the stretched first bag while moving the article;
   h. moving the first bag from the expander members while maintaining the expander members in their bag expanding positions; and,
   i. resiliently contracting the first bag about the article as the bag moves from the expander members.

7. A method of packaging articles in plastic bags comprising:
   a. providing a storage location for a chain of plastic bags each defining a transverse end opening and a transverse end seal spaced from the end opening to define a fillable space therebetween;
   b. feeding a bag of the chain to an opening station with the bag proceeding toward the opening station open end first;
   c. at least partially opening the bag at said opening station and supporting said open end of said bag at a predeterined location;
   d. gripping said open end of said bag on one side thereof;
   e. removing said bag from said opening station while gripping said open end and moving said bag beyond said opening station while simultaneously moving a second succeeding bag of the chain toward said opening station;
   positioning said first bag about projecting expander members while moving said bag;
   g. releasing said first bag when said first bag is in a predetermined position with respect to said expander members and said second bag is at said opening station;
   h. at least partially opening said second bag;
   i. moving said expander members relative to each other to at least fully open said first bag;
   j. separating said first bag from said second bag; and,
   k. inserting an article into said first bag while supported on said expander members and removing said first bag and the article therein from said expander members.

8. A method as claimed in claim 7 wherein successive bags of the chain are connected by a transverse weakened chain portion and wherein separating said first and second bags comprises breaking said chain along the weakened portion between said first and second bags by expanding said first bag while maintaining said second bag positioned at said opening station.

9. A method of packaging article in bags comprising:
   a. providing a storage location for a chain of bags each defining a transverse end opening and a transverse closed end space from the end opening to define a fillable space therebetween;
   b. feeding a bag of said chain of bags to an opening station with the bag proceeding toward the opening station open end first;
   c. at least partially opening a bag at said opening station and supporting said open end of said bag at a predetermined location;
   d. gripping said open end of said bag on one side thereof;
   e. removing said bag from said opening station and moving said bag beyond said opening station while simultaneously moving a second succeeding bag of the chain toward said opening station;
   f. positioning said first bag at a loading station;
   g. releasing said first bag when said first bag is at the loading station and said second bag is at said opening station;
   h. at least partially opening said second bag while supporting said first bag at said loading station;
   i. separating said first bag from said second bag while opening said first bag;
   j. inserting an article into said first bag while supported at said loading station and removing said bag and article therefrom.

* * * * *